3,539,517
METHOD OF PREPARING FERRITE POWDERS COMPRISING DISINTEGRATING CALCINED OXIDES COOLED TO LIQUID NITROGEN TEMPERATURES
Janina J. Mitchell, Matawan, and Marion W. Woodruff, West Allenhurst, N.J., assignors to the United States of America as represented by the Secretary of the Army
No Drawing. Filed Mar. 1, 1968, Ser. No. 709,780
Int. Cl. C04b 35/26, 35/30; C01g 49/08
U.S. Cl. 252—62.62          2 Claims

ABSTRACT OF THE DISCLOSURE

Ferrite powders are prepared by first calcining stoichiometric amounts of the metals necessary to form the ferrite. The calcined batch is then cooled in a suitable cryogenic liquid such as liquid nitrogen. The resultant batch is then shattered into very fine particles with a pestle, jet propulsion, explosive processes, etc. The very fine particles are then formed into the desired geametry, and sintered.

---

The invention described herein may be manufactured, used, and licensed by or for the Government for governmental purposes without the payment to us of any royalty thereon.

BACKGROUND OF THE INVENTION

This invention relates to a method of preparing ferrite powders.

It is known that ferrite powders can be prepared from mixtures of the oxides of metals necessary to form the ferrite. In general, the oxides are mixed, calcined at the temperature required to effect the solid state reaction, crushed by ball milling and then sintered at the necessary temperature in a furnace or hot press. The above-described method is not entirely satisfactory in that contamination of the ferrite results from the erosion of the mill or balls during the lengthy grinding procedure. That is, in the grinding procedure, particles of iron are torn from the grinding surface thereby causing compositional changes that alter the electrical properties of the ferrite. In addition, this contamination, being uncontrolled, prevents reproduction of electrical characteristics from batch to batch.

The general object of this invention is to provide an improved method of preparing ferrite powders. A more specific object of this invention is to provide such a method wherein the resulting ferrite will be dense, free of contamination, and have improved electrical properties that are reproducible from batch to batch.

SUMMARY OF THE INVENTION

The method of the invention involves calcining the oxides of the metals necessary to form the ferrite. The calcined batch is then frozen by placing it into a suitable cryogenic liquid such as liquid nitrogen. The resultant batch is then shocked in its frozen state, formed into the desired geometry and sintered.

The freezing of the calcined mix causes extreme embrittlement. This makes the mix shatter into very fine particles when subjected to shock treatment. The shock treatment itself can be applied by different means such as, impact with a pestle, jet propulsion, or explosive processes caused by exploding wires, explosive plastics, etc.

The method eliminates or greatly reduces the need to ball mill the calcined material which is required to be in a highly pulverized state prior to final sintering. Such ball milling as may be required is of short duration since it is only necessary to de-agglomerate the final particles produced as a result of the shocking step. Thus, the problem of contamination is greatly reduced and it is possible to reproduce electrical characteristics from batch to batch. Moreover, the use of cryogenic crushing has been shown to yield a powder which sinters much more readily than conventional ball-milled material; such sintering occurring at a lower temperature and yielding denser final products. This increased response to sintering is of especial importance where the problem of volatilizing materials causes uncontrollable stoichiometric composition variations due to high sintering temperatures.

The initial calcined batch or mix is obtained by mixing stoichiometric amounts of the oxides of the metals necessary to form the ferrite and then calcining at the required temperature as is known in the art. This temperature is dependent upon the particular oxides being included in the ferrite being prepared.

After freezing and shocking, the batch or mix is sintered, as desired, in a furnace or hot press. For example, if small and simple shapes and a lower sintering temperature is required, hot pressing is more advantageous. Since hot pressing cannot handle bulky or complex shapes, if such shapes are desired, furnace sintering may be utilized.

DETAILED DESCRIPTION OF THE PREFERRED EMBODIMENT

Nicked oxide, zinc oxide, and iron oxide are mixed in the stoichiometric amounts necessary to form the ferrite $(Ni_{0.43}Zn_{0.57}O)(Fe_2O_3)$. The mix is calcined at about 900° C., the calcined mix transferred into a pre-cooled heavy duty tool steel mortar filled with liquid nitrogen, and then shocked or crushed with a pre-cooled pestle. Individual batches of powder are then hot pressed at about 900° C., 950° C., and 1000° C., and at a pressure of about 8000 pounds per square inch.

The resulting ferrites have improved properties as compared to the same ferrites prepared by the usual ball milling technique. That is, the ferrites prepared by the method of the invention have higher permeability, a higher density, and a lower ferromagnetic resonance line width as compared to the ball milled product. For example, batches of cryogenically shocked materials hot pressed at about 900° C. have higher permeabilities when subjected to a biasing field, higher densities, and lower ferromagnetic resonance line width than conventionally ball-miled materials hot pressed at 1000° C. under similar conditions. Moreover, the electrical properties of the ferrite produced by the method of the invention are reproducible from batch to batch.

Various modifications of the method are considered to come within the scope of the invention. For example, other molecular combinations of starting materials can be used such as metallic nitrates, metallic oxalates, etc. Moreover, the method is applicable to the preparation of other types of ceramic materials.

The foregoing description is to be considered merely as illustrative of the invention and not in limitation thereof.

What is claimed is:

1. A method of preparing ferrite powders comprising calcining stoichiometric amounts of the oxides of the metals necessary to form the ferrite, cooling the calcined oxides in liquid nitrogen to liquid nitrogen temperatures, shocking the cooled oxides sufficiently to cause them to shatter into very fine particles, and sintering the fine particles.

2. A method of preparing a ferrite powder of the formula $(Ni_{0.43}Zn_{0.57}O)(Fe_2O_3)$ comprising mixing nickel oxide, zinc oxide and iron oxide in the stoichiometric amounts necessary to form the ferrite, calcining the oxides at about 900° C., cooling the calcined oxides to liquid nitrogen temperatures, shocking the cooled oxides sufficiently to cause them to shatter into very fine particles, and hot pressing the fine particles at about 1000° C. and at a pressure of about 8000 pounds per square inch.

References Cited

UNITED STATES PATENTS

| | | | |
|---|---|---|---|
| 3,218,726 | 11/1965 | Muir | 34—5 |
| 3,242,089 | 3/1966 | Bartow et al. | 252—62.62 |

TOBIAS E. LEVOW, Primary Examiner

R. D. EDMONDS, Assistant Examiner

U.S. Cl. X.R.

23—51; 106—39; 252—62.56